UNITED STATES PATENT OFFICE.

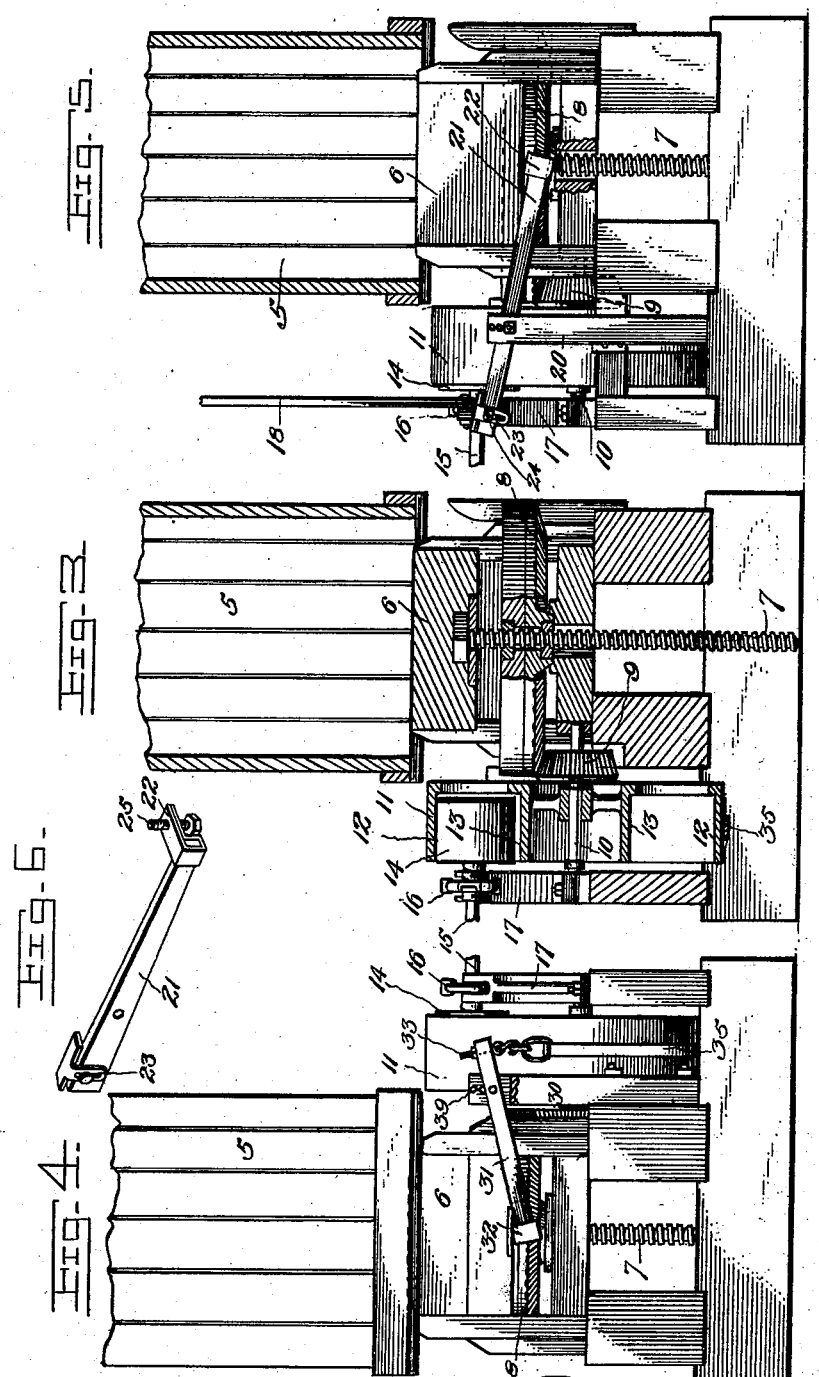

LEMUEL ARTHUR SHANNON, OF CULLMAN, ALABAMA, ASSIGNOR OF TWO-THIRDS TO SILAS P. McDONALD AND IRA CHILDS, OF CULLMAN, ALABAMA.

AUTOMATIC STOP MECHANISM FOR SCREW-PRESSES.

SPECIFICATION forming part of Letters Patent No. 692,723, dated February 4, 1902.

Application filed September 3, 1901. Serial No. 74,151. (No model.)

*To all whom it may concern:*

Be it known that I, LEMUEL ARTHUR SHANNON, a citizen of the United States, residing at Cullman, in the county of Cullman and State of Alabama, have invented a new and useful Automatic Stop Mechanism for Screw-Presses, of which the following is a specification.

My invention relates to certain improvements in screw-presses employed for the compression of cotton, hay, and similar materials, and has for its object to provide such presses with an attachment for automatically stopping the same at a predetermined point.

In friction-driven presses much difficulty is experienced in stopping the press when the follower-block has reached its lowest position, the momentum of the friction-wheel at times continuing the rotation of the combined gear-wheel and nut after the follower-screw has reached its lowest point, resulting in the upward movement of the gear-wheel on the screw and the consequent disengagement of the gear-teeth. To overcome this difficulty, I have devised an attachment which may be adjusted to any press of the friction type and by which the follower-block and the friction pulley or wheel may be stopped at the proper point, the downward movement of the follower effecting the automatic stoppage of the driving mechanism and requiring no attention on the part of the pressman.

Figure 1:
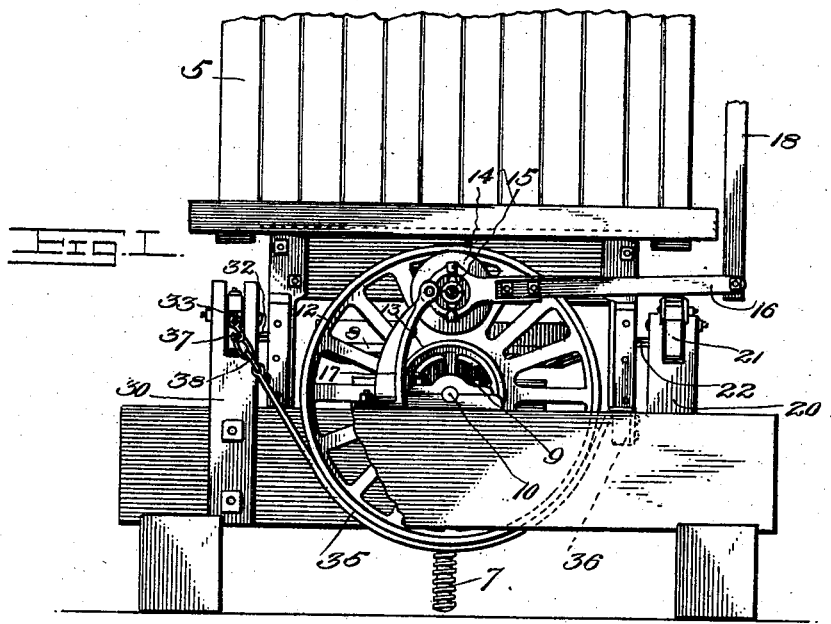
Figure 2:
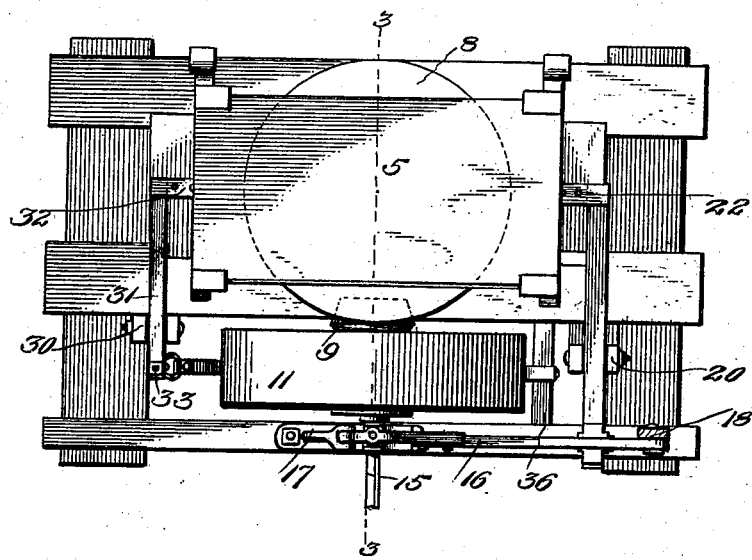

In the accompanying drawings, Figure 1 is a side elevation of the lower portion of a cotton-press and its friction driving mechanism, illustrating the construction and arrangement of the automatic stopping mechanism forming the subject of the present invention. Fig. 2 is a plan view of the same, the box or casing of the press being omitted. Fig. 3 is a transverse sectional elevation of the press on the line 3 3, Fig. 2. Fig. 4 is an end elevation of the press and stopping mechanism looking from the left of Figs. 1 and 2. Fig. 5 is a view similar to Fig. 4 looking from the right of Figs. 1 and 2. Fig. 6 is a perspective view of a detail of construction more particularly referred to hereinafter.

Similar numerals of reference indicate corresponding parts throughout the various figures of the drawings.

5 designates the box or casing of the press, which may be of wood or of other material, and 6 is a follower-block of the usual type designed to travel upwardly within the box or casing and to compress the material contained therein.

To the under side of the follower 6 is secured an elongated screw 7, to the threads of which is adapted the threaded hub of a gear-wheel 8, which receives motion from a pinion 9, mounted on a shaft 10, the rotations of this shaft being imparted to the gear-wheel 8 and resulting in the vertical movement of the follower-block. On the shaft 10 is secured a friction-wheel 11, having two annular friction-faces 12 and 13, arranged, respectively, on the inner surface of the rim and on the outer face of the wheel-hub. In the annular space formed between these two friction-faces and designed for operative contact with either of them is a friction-roller 14, secured to a shaft 15, driven from any suitable source of power. The shaft 15 is adapted to bearings carried at one end of a lever 16, fulcrumed to a standard 17 and connected to an operating lever or rod 18, which usually extends up to the gin-floor within convenient reach of the pressman. Vertical movement of the rod 18 and lever 16 results in the contact of the friction-roller with one or other of the faces of the friction-wheel, a constant travel in one direction of the friction-roller being thus transmitted in either direction to the friction-wheel to effect the raising and lowering of the follower-block. The arrangement is such that when the parts are in the position illustrated in Figs. 1 and 3, with the friction-roller in contact with the face 12, the block will be traveled upwardly to compress the cotton, and when the friction-roller is in contact with the face 13 the direction of travel will be reversed and the follower will be lowered. As a general rule when the follower has reached the lowest possible position and the screw to which it is attached can move no farther downwardly the momentum acquired by the friction-wheel will turn the gear-wheel 8, causing the same to travel upwardly on the screw and effect the disengagement of the teeth of the gear-wheel and the pinion 9. To reëngage the teeth, the gear-wheel 8 must be turned by hand, an operation which requires considerable time and in some cases becomes necessary after the compression of each bale.

In carrying out my invention I provide at one side of the machine a standard 20, secured to the mud-sill and forming a fulcrum for an operating-lever 21, having at one end a projecting finger 22, extending into the path of the follower-block and adapted to be depressed by the same when the follower-block has nearly reached its lowest position. The opposite end of the lever passes under the operating-lever 16 and is adapted to raise the same to effect the disengagement of the friction-roller from the hub friction-face 13. To provide for adjustment, the outer end of the lever 21 is provided with a movable plate having slotted ears 23 for the passage of a securing-bolt 24, and the standard 20 is provided with a number of openings in any one of which the fulcrum-pin of the lever 21 may be placed. The finger 21 of the lever may also be provided with a vertical set-screw 25, as shown in Fig. 6, in order to provide greater delicacy of adjustment. On the opposite side of the machine is a standard 30, forming a fulcrum for a lever 31, having a projecting finger 32 in the path of movement of the follower-block. The outer end of the lever 31 is provided with an eyebolt 33, which may be adjusted to any desired position. The eyebolt is connected to the end of band-brake 35, arranged in contact with the periphery of the friction-wheel and having one of its ends secured to a cross-bar 36 at the opposite side of the framework. The connection between the free end of the band and the eyebolt is made by a hook 37 and a number of links, so that a considerable degree of adjustment is provided for aside from that which may be had by the movement of the eyebolt. Further adjustment is provided for by arranging in the upper end of the standard a number of openings 39, in any one of which the fulcrum-pin of the lever 31 may be secured.

In operating the device the downward movement of the follower-block will effect the simultaneous or successive depressions of the levers 21 and 31. The depression of the lever 21 will cause its outer end to engage under the operating-lever 16 and move the friction-roller 14 out of contact with the frictional surface 13. At the same time the lever 31 has tightened the friction-brake on the periphery of the friction-wheel and serves to gradually retard and finally stop its movement. In practice I find that this operation will stop the press at the desired point, leaving the gears in engagement and ready for the reverse movement, while its automatic action makes it impossible for any accident to occur through carelessness or by the employment of inexperienced hands.

The device may be modified in a variety of ways and the proportions changed to suit different presses without departing from the spirit or sacrificing any of the advantages of my invention.

Having thus described my invention, what I claim is—

The combination with a press including a follower, a screw-shaft 7 connected thereto, a threaded hub 8 having gear-teeth, a pinion 9 intermeshing therewith, a shaft 10 carrying the pinion, a friction-wheel 11 mounted on the shaft and having two concentric friction-faces 12 and 13, a friction-roller 14 adapted to be moved in engagement with one or other of said friction-faces, a pivoted lever 16 carrying said friction-roller, a lever 21, a standard 20 forming an adjustable fulcrum for said lever, one end of said lever being arranged in operative contact with the pivoted lever 16 and the opposite end being arranged in the path of downward movement of the follower-block, a lever 31 arranged on the opposite side of the press, a standard 30 carrying the same, a band-brake 35 partly embracing the periphery of the friction-wheel and having its free end adjustably connected to one end of the lever 31, the opposite end of said lever 31 being arranged in the path of downward movement of the follower-block, substantially as specified.

In testimony that I claim the foregoing as my own I have hereto affixed my signature in the presence of two witnesses.

LEMUEL ARTHUR SHANNON.

Witnesses:
E. E. MATTHEWS,
JOHN J. FOWLER.